United States Patent
Hutschemaekers et al.

(10) Patent No.: US 11,783,013 B2
(45) Date of Patent: Oct. 10, 2023

(54) PROTECTED PROCESSING OF OPERATIONS

(71) Applicant: KONINKLIJKE PHILIPS N.V., Eindhoven (NL)

(72) Inventors: Paul Hubert Matthias Hutschemaekers, Sint-Oedenrode (NL); Maarten Peter Bodlaender, Noord Brabant (NL); Oscar Garcia Morchon, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 120 days.

(21) Appl. No.: 17/414,056

(22) PCT Filed: Dec. 11, 2019

(86) PCT No.: PCT/EP2019/084533
§ 371 (c)(1),
(2) Date: Jun. 15, 2021

(87) PCT Pub. No.: WO2020/126711
PCT Pub. Date: Jun. 25, 2020

(65) Prior Publication Data
US 2022/0058244 A1 Feb. 24, 2022

(30) Foreign Application Priority Data
Dec. 18, 2018 (EP) .................................... 18213733

(51) Int. Cl.
*G06F 21/14* (2013.01)
(52) U.S. Cl.
CPC .................... *G06F 21/14* (2013.01)

(58) Field of Classification Search
CPC ..................................................... G06F 21/14
(Continued)

(56) References Cited

U.S. PATENT DOCUMENTS

| 7,512,986 | B2 | 3/2009 | Shen-Orr et al. |
| 8,918,768 | B2 | 12/2014 | Chevallier-Mames et al. |

(Continued)

FOREIGN PATENT DOCUMENTS

| EP | 3012762 A1 | 4/2016 |
| WO | 2018050335 A1 | 3/2018 |

OTHER PUBLICATIONS

International Search Report and Written Opinion from PCT/EP2019/084533 dated Jun. 25, 2020.

*Primary Examiner* — Michael S McNally

(57) ABSTRACT

A computer-implemented method of obfuscating a computer code comprises receiving (1201) an original computer program comprising a plurality of code blocks with computer instructions, the original computer program operable on input data within an input space, the original computer program operable to follow an execution path through the plurality of code blocks when receiving the input data, wherein the input space is segmented into at least one segment according to a segmentation, each segment comprising a subset of the input space containing inputs that correspond to a same execution path. A plurality of updated code blocks is included (1302) in the updated computer program. Selection code is operable 1303, during execution of the updated computer program, to select an updated code block of the plurality of updated code blocks in dependence on the input data. The selection code is included (1304) in the updated computer program.

19 Claims, 9 Drawing Sheets

(58) Field of Classification Search
USPC .......................................................... 726/26
See application file for complete search history.

(56) References Cited

U.S. PATENT DOCUMENTS

| | | | |
|---|---|---|---|
| 9,178,905 B1* | 11/2015 | Adams | H04L 63/1416 |
| 2003/0093685 A1* | 5/2003 | Tobin | G06F 21/126 |
| | | | 713/190 |
| 2016/0117155 A1* | 4/2016 | Salmon-Legagneur | ..................... |
| | | | G06F 21/14 |
| | | | 717/156 |
| 2019/0228137 A1* | 7/2019 | Johansson | G06F 21/602 |

* cited by examiner

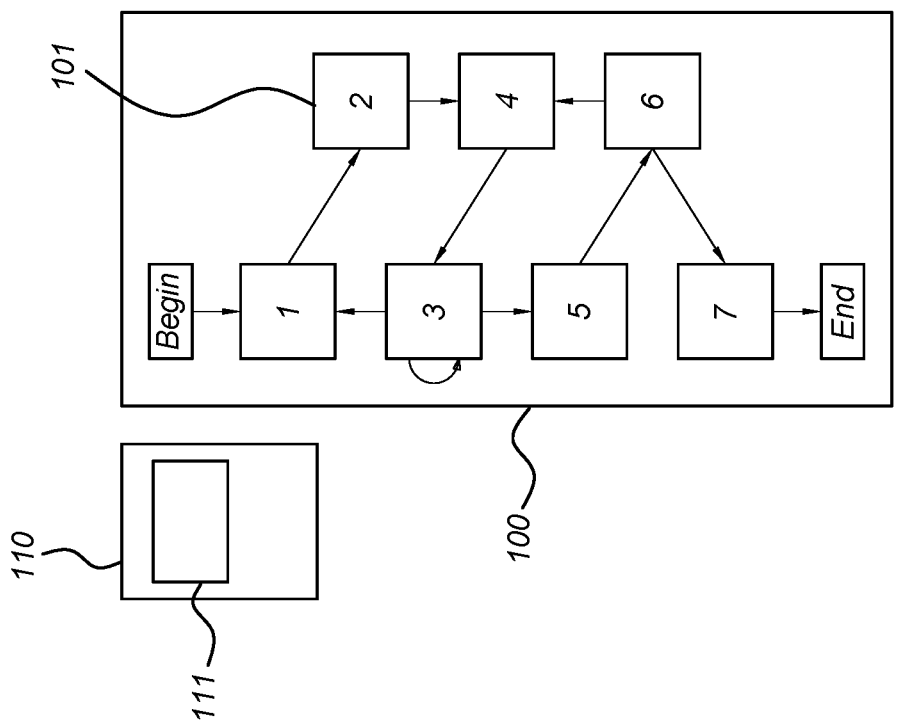

*Fig. 4*

Fig. 6
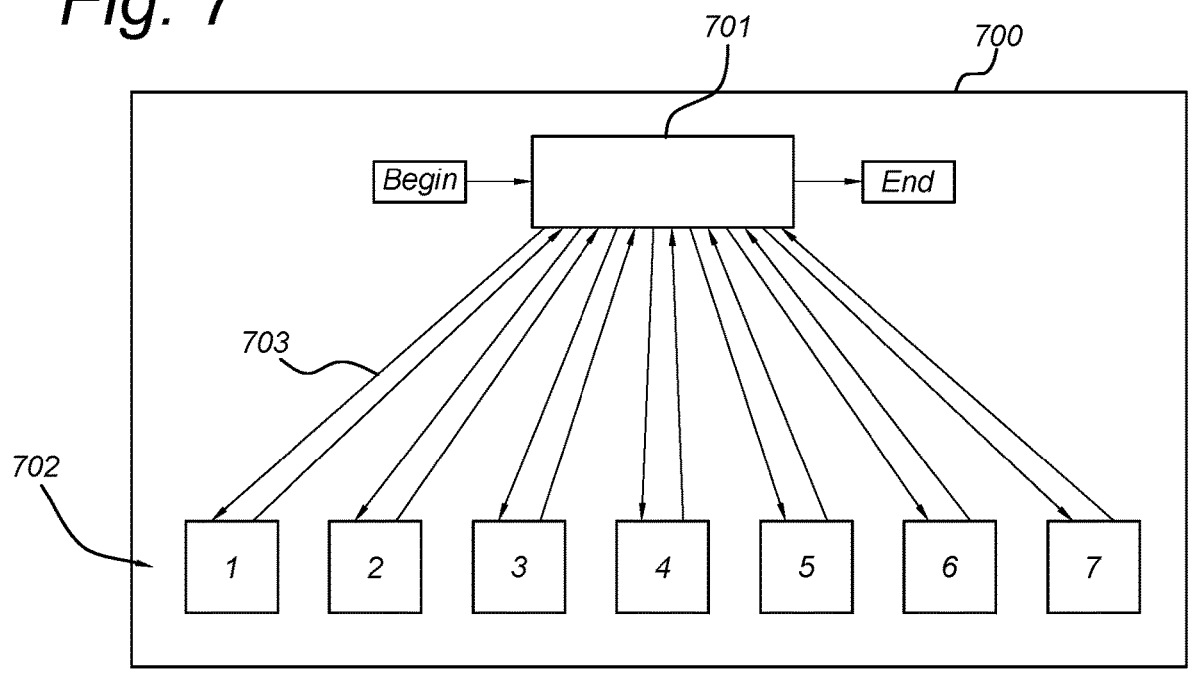
Fig. 7
Fig. 8
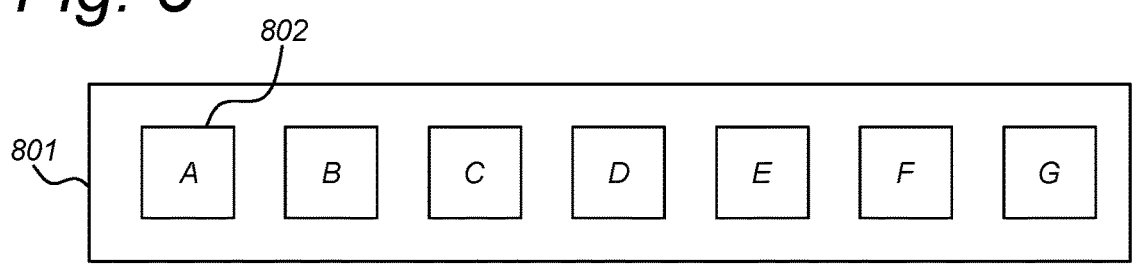

Fig. 11

|   | 1 | 2 | 3 | 4 | 5 | 6 | 7 | A | B | C | D | E | F | G | H | I | J | K | L | M | N |
|---|---|---|---|---|---|---|---|---|---|---|---|---|---|---|---|---|---|---|---|---|---|
| 1 |   |   |   |   |   |   |   | V | V | V | V | V | V |   |   |   |   |   |   |   |   |
| 2 |   |   |   |   |   |   |   | V | V | V | V | V | V |   |   |   |   |   |   |   |   |
| 3 |   |   |   |   |   |   |   | V | V | V | V | V | V |   |   |   |   |   |   |   |   |
| 4 |   |   |   |   |   |   |   | V | V | V | V | V | V |   |   |   |   |   |   |   |   |
| 5 |   |   |   |   |   |   |   | V | V | V | V | V | V |   |   |   |   |   |   |   |   |
| 6 |   |   |   |   |   |   |   | V | V | V | V | V | V |   |   |   |   |   |   |   |   |
| 7 |   |   |   |   |   |   |   | V | V | V | V | V | V |   |   |   |   |   |   |   |   |
| A |   |   |   |   |   |   |   |   |   |   |   |   |   |   | V | V | V | V | V | V | V |
| B |   |   |   |   |   |   |   |   |   |   |   |   |   |   | V | V | V | V | V | V | V |
| C |   |   |   |   |   |   |   |   |   |   |   |   |   |   | V | V | V | V | V | V | V |
| D |   |   |   |   |   |   |   |   |   |   |   |   |   |   | V | V | V | V | V | V | V |
| E |   |   |   |   |   |   |   |   |   |   |   |   |   |   | V | V | V | V | V | V | V |
| F |   |   |   |   |   |   |   |   |   |   |   |   |   |   | V | V | V | V | V | V | V |
| G |   |   |   |   |   |   |   |   |   |   |   |   |   |   | V | V | V | V | V | V | V |
| H | V | V | V | V | V | V | V |   |   |   |   |   |   |   |   |   |   |   |   |   |   |
| I | V | V | V | V | V | V | V |   |   |   |   |   |   |   |   |   |   |   |   |   |   |
| J | V | V | V | V | V | V | V |   |   |   |   |   |   |   |   |   |   |   |   |   |   |
| K | V | V | V | V | V | V | V |   |   |   |   |   |   |   |   |   |   |   |   |   |   |
| L | V | V | V | V | V | V | V |   |   |   |   |   |   |   |   |   |   |   |   |   |   |
| M | V | V | V | V | V | V | V |   |   |   |   |   |   |   |   |   |   |   |   |   |   |
| N | V | V | V | V | V | V | V |   |   |   |   |   |   |   |   |   |   |   |   |   |   | under 35 U.S.C. § 371 of International Application No.
PROTECTED PROCESSING OF OPERATIONS

CROSS-REFERENCE TO PRIOR APPLICATIONS

This application is the U.S. National Phase application under 35 U.S.C. § 371 of International Application No. PCT/EP2019/084533, filed on Dec. 11, 2019, which claims the benefit of EP Patent Application No. EP 18213733.1, filed on Dec. 18, 2018. These applications are hereby incorporated by reference herein.

FIELD OF THE INVENTION

The invention relates to protecting a program from being analyzed for finding vulnerabilities.

BACKGROUND OF THE INVENTION

Software can comprise bugs and vulnerabilities that affect the safety and security of systems, such as healthcare systems. Solutions exist to find bugs and discover vulnerabilities, even in an automatic way. Fuzzing is a technique to find bugs in a program. It involves feeding the program with arbitrary inputs that might trigger the bug. Such fuzzing may make use of knowledge of the program or the grammar of the valid program input. A known fuzzer is AFL (American Fuzzy Lop). In AFL, the code to be fuzzed is firstly instrumented so that AFL later can track the coverage and guide the fuzzing process accordingly. Angr is a symbolic execution engine that also allows finding bugs in code. Driller is a hybrid approach of AFL in angr in which angr is used to go through difficult blocks and once this is done, the AFL is used to achieve large code coverage. Although fuzzers can be used to debug a program and find and correct bugs, a malicious user can use any bugs found to compromise the program.

U.S. Pat. No. 8,918,768 discloses receiving a first source code having a code block to update the first source code with multiple copies of the code block to protect against correlation attacks. The code block can perform one or more operations for execution based on the first source code. The operations can be performed via a random one of the copies of the code block. A second source code based on the updated first source code can be generated to be executed by a processor to produce an identical result as the first source code.

U.S. Pat. No. 8,918,768 further discloses updating the first source code by adding selection code and two or more updated code blocks, the updating resulting in an updated first source code having two or more execution paths, each execution path equivalent to the particular execution path, the selection code including a selection variable, the selection variable having one of a number of selection values, each selection value representing one of the execution paths, the selection code to randomly select one of the execution paths, each execution path including a separate one of the updated code blocks, each updated code block having a copy of the code block and a neutral code, the neutral code referencing one of the selection values and the selection variable, the neutral code to perform operations on the variable using the one selection value and the selection variable to obfuscate the updated first source code; and generating second source code based on the updated first source code, wherein a first executable code compiled from the first source code includes instructions compiled from the particular executable path, wherein a second executable code compiled from the second source code includes instructions compiled from the two or more execution paths, and wherein the first executable code and the second executable code when executed by a processor produce an identical result.

EP 1 410 140 B1 discloses multiple execution paths for a particular function. For this obfuscation, each of a plurality of execution paths achieves the same result, and any path may optionally be randomly selected during the execution of the software. Certain execution paths may optionally and preferably never be reached. Therefore, optionally and more preferably, the "random" selection is in fact weighted, in order for certain paths to be chosen more frequently. This weighting further obscures the function of the software and makes analysis more difficult by increasing the difficulty of guessing which branches are never used ("dead code").

However, it will be appreciated that these solutions do not provide sufficient protection against external analysis, by humans or in particular by automated analysis software.

SUMMARY OF THE INVENTION

It would be advantageous to have an improved method of obfuscating a computer code.

To better address this concern, a method of obfuscating a computer code is provided, the method comprising:

receiving an original computer program comprising a plurality of code blocks with computer instructions, the original computer program operable on input data within an input space, the original computer program operable to follow an execution path through the plurality of code blocks when receiving the input data, wherein the input space is segmented into at least one segment according to a segmentation, each segment comprising a subset of the input space containing inputs that correspond to a same execution path; and generating an updated computer program based on the original computer program, wherein generating the updated computer program comprises:

including a plurality of updated code blocks in the updated computer program;

generating selection code operable, during execution of the updated computer program, to select an updated code block of the plurality of updated code blocks in dependence on the input data; and including the selection code in the updated computer program along with transition code involving a transition of an execution point to the updated block selected by the selection code, wherein the selection code is configured to cause the updated computer program to segment the input space according to an updated segmentation, the updated segmentation being different from the segmentation of the original computer program, and wherein the original computer program and the updated computer program are operable to generate at least an identical result, which identical result depends on the input data.

By including the selection code that causes the segmentation of the input space to be different from the original program by selecting a next block in dependence on the input to the program, an analyzer will find it more difficult to find vulnerabilities in the computer program. Moreover, the input space may be segmented in arbitrarily complex ways by adding as many of such selection code along with transition code as desired. Thus, the complexity of the program structure is increased making it more difficult, more time-consuming, or more memory-intensive to find complete information about the structure of the program. Depending on the complexity of the segmentation, it may be difficult for an analyzer to test all the blocks and transitions of the updated computer program. Moreover, it may become more difficult to interpret the program structure, insofar it has been analyzed. Moreover it may be more difficult to detect code blocks that have bugs or vulnerabilities in them.

The updated code block selected by the selection code may be fully determined by the input data. In this case, the segmentation appears to be highly relevant for an analyzer.

The method may comprise flattening the computer program by including in the updated computer program a dispatcher and replacing a plurality of transition code, involving a transition from a first code block to a second code block, by an updated transition code involving a transition from the first code block to the dispatcher and a transition from the dispatcher to the second code block. The dispatcher may make analysis of execution paths more difficult.

The dispatcher may comprise a plurality of first dispatcher code blocks, wherein the first code block comprises the selection code operable, during execution of the updated computer program, to select a first dispatcher code block among the plurality of first dispatcher code blocks in dependence on the input data according to the updated segmentation and transition code involving the transition from the first code block to the first dispatcher code block. This is a suitable way to add more blocks to the program and introduce a complex segmentation with respect to execution path, while still respecting the structure of the original computer program.

The dispatcher may comprise a plurality of second dispatcher code blocks, and the first dispatcher code block may comprise the selection code operable, during execution of the updated computer program, to select a second dispatcher code block among the plurality of second dispatcher code blocks in dependence on the input data according to the updated segmentation and transition code involving a transition from the first dispatcher code block to the second dispatcher block. Two layers of blocks allow the dispatching process executed by the dispatcher to include two transitions to one of many blocks, adding further complexity to the segmentation.

The first dispatcher block or the second dispatcher block may comprise transition code involving a transition therefrom to the second code block. Thus, the code of the original program is resumed after executing the relevant dispatcher code block(s).

The step of including a plurality of updated code blocks in the updated computer program may comprise generating a first updated code block from a first code block of the original program by replacing code of the first code block that references a first variable, by code that references either one of the first variable or a second variable in dependence on a value of a mode variable, so that in case the value of the mode variable indicates a normal mode, on exit of the first updated code block the value of the first variable is identical to the value of the first variable on exit of the first code block of the original program, and in case the value of the mode variable indicates a neutral mode, the instructions of the updated code block do not affect the first variable. This allows to make the execution path more complex, because sometimes a block is executed in a neutral mode and sometimes in a normal mode, where only in normal mode does the program perform the operations that are relevant for producing the program's result.

In case the value of the mode variable indicates a neutral mode, the instructions of the updated code block may be configured to change the second variable. This allows the program in neutral mode to look relevant from outside, as it has an influence on a variable.

The transition code involving a transition of an execution point to the updated block selected by the selection code may be configured to perform the transition with the mode variable having the value indicating the neutral mode. This way, no matter which block is selected by the selection code, no variables are affected that have an influence on the program's result.

The first updated code block may comprise transition code that, when the value of the mode variable indicates neutral mode, sets the mode variable to a value that indicates the normal mode and performs a transition of the execution point to an address based on a stored indication of a code block. This allows the program to resume its operations after having executed the first updated code block in neutral mode.

The first updated code block may comprise at least one of the dispatcher code blocks and the updated transition code involving the transition from the first code block to the dispatcher may be configured to cause execution of the at least one dispatcher code block with the mode variable having the value indicating the neutral mode. This way the dispatcher code blocks only perform the dispatching operation, but do not change a program variable that is relevant for the program's result.

The first updated code block may comprise at least one of the first dispatcher code blocks and the at least one of the first dispatcher code blocks may be configured to execute the transition code involving a transition from the first dispatcher code block to the second dispatcher block if the mode variable has the value indicating the neutral mode, and operates transition code corresponding to the execution path of the original computer program if the mode variable has the value indicating the normal mode. This way, the first updated code block can be an augmented version of an original code block, and can perform the dispatcher function or the original code block's function, depending on the mode variable.

The updated transition code involving the transition from the dispatcher to the second code block may be configured to cause execution of the second code block with the mode variable having the value indicating the normal mode. Thus, normal operation may be resumed when leaving the dispatcher.

The step of including the selection code in the updated computer program along with transition code for transferring an execution point to the updated block selected by the selection code may comprise identifying original transition code involving a transition of the execution point from a first original code block of the original program and a second original code block of the original program, and replacing the original transition code by the transition code involving the transition of the execution point to the updated code block selected by the selection code, wherein said latter transition code comprises code to store an identification of the second original code block, to enable one of the updated code blocks to perform a transition to the second original code block using the stored identification. This allows the normal operation to be resumed at the stored block.

The selection code may be operable to compute a hash of at least part of the input data. This is one suitable example of making the selection dependent on the input data.

The above-disclosed methods may be computer-implemented.

According to another aspect, a computer program is provided comprising instructions to cause an apparatus to perform a method set forth above. The computer program may be stored on a computer readable non-transitory storage media.

According to another aspect, a system for obfuscating a computer code is provided, the system comprising a memory configured to store an original computer program comprising a plurality of code blocks with computer instructions, the original computer program operable on input data within an input space, the original computer program operable to follow an execution path through the plurality of code blocks when receiving the input data, wherein the input space is segmented into at least one segment according to a segmentation, each segment comprising a subset of the input space containing inputs that correspond to a same execution path; and a control unit configured to perform steps of:

generating an updated computer program based on the original computer program, wherein generating the updated computer program comprises:

including a plurality of updated code blocks in the updated computer program;

generating selection code operable, during execution of the updated computer program, to select an updated code block of the plurality of updated code blocks in dependence on the input data;

including the selection code in the updated computer program along with transition code involving a transition of an execution point to the updated block selected by the selection code, wherein the selection code is configured to cause the updated computer program to segment the input space according to an updated segmentation, the updated segmentation being different from the segmentation of the original computer program, and wherein the original computer program and the updated computer program are operable to generate at least an identical result, which identical result depends on the input data.

It will be appreciated by those skilled in the art that two or more of the above-mentioned embodiments, implementations, and/or aspects of the invention may be combined in any way deemed useful.

BRIEF DESCRIPTION OF THE DRAWINGS

These and other aspects of the invention are apparent from and will be elucidated with reference to the embodiments described hereinafter. In the drawings, FIG. 1 shows a diagram of an example computer program.

FIG. 2A shows a table listing the edges in the example computer program.

FIG. 2B shows another representation of the edges in the example computer program.

FIG. 4 shows a representation of the edges in the first example updated computer program.

FIG. 6 shows a representation of the edges in the second example updated computer program.

FIG. 7 shows a diagram of a third example updated computer program including a dispatcher.

FIG. 8 shows a diagram of a first example of a dispatcher.

FIG. 11 shows a representation of the edges based on the second example of the dispatcher.

DETAILED DESCRIPTION OF THE EMBODIMENTS

Figure 3:
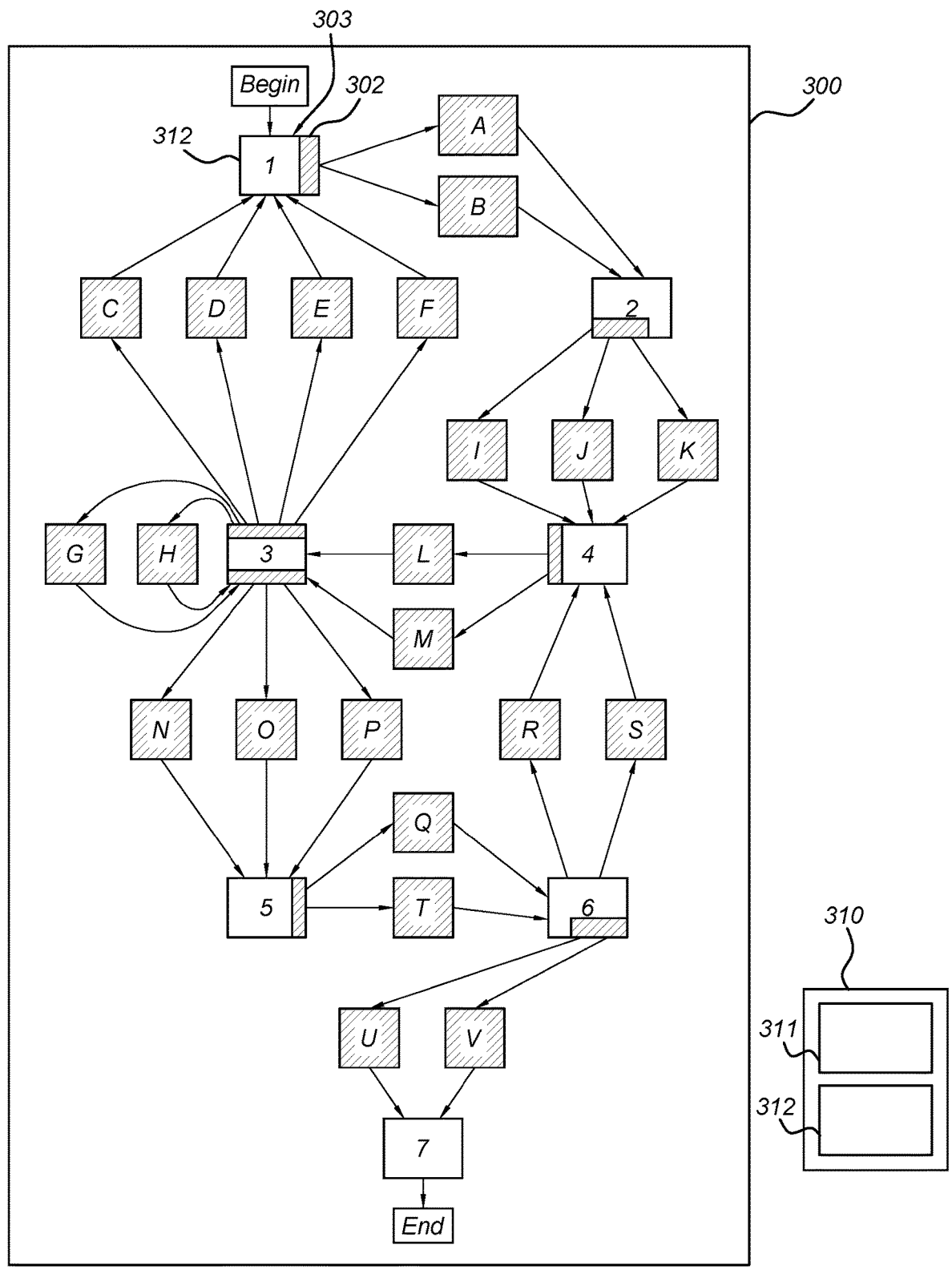
FIG. 3 shows a diagram of a first example updated computer program.

It will be understood that the various embodiments used to describe the principles of the present disclosure in this patent document are by way of illustration only and should not be construed in any way to limit the scope of the disclosure. Those skilled in the art may understand that the principles of the present disclosure may be implemented in any suitably arranged system or device.

FIG. 1 shows a diagram of an example computer program 100. The program contains a plurality of code blocks 101, numbered 1 to 7. Transitions from one block to another block are indicated by means of arrows. Some blocks always transition to the same next block. For example block 1 always transitions to block 2. Other blocks can transition to several different next blocks. For example block 6 can transition to block 4 or to block 7. Such a block 6 can comprise a condition, for example by means of an if-statement, to decide which of block 4 and block 7 will be the next block to be executed. A block can also contain a loop, meaning that a block may be repeated several times. This is the case for block 3. Possible transitions between blocks may be referred to as edges. The figure also shows a diagram of runtime memory 110. The computer program 100 may, during execution, read and write data from and to memory addresses representing program variables 111.

FIG. 2A shows a table listing the edges in the example computer program 100. Transitions are possible from a block indicated in the left column to a block indicated in the right column of the same row. FIG. 2B shows another representation of the edges in the example computer program. The rows indicate which block the transition is from, and the columns indicate which block the transition is to. A V in a certain position indicates that an edge exists from the block indicated by the row to the block indicated by the column. As will be observed from these diagrams, the simple example program 100 contains 9 edges.

FIG. 3 shows a diagram of a first example updated computer program based on the first example computer program 100. The structure of the original program 100 has been preserved. However, besides the blocks numbered 1 to 7, the program 300 contains additional blocks A to V. Moreover, the original code blocks 303 have been updated to include, besides the original code 301, selection and transition code 302. The figure also shows a diagram of runtime memory 310 with variables 311 that are referenced by the updated original code blocks 303 and one or more dummy variables 312. During execution of the updated computer program 300, the selection code selects one of the additional blocks A to V, in dependence on the input data provided to the computer program 300. For example, block 1 of computer program 300 selects either block A or block B as the next block, using some criterion applied to the input data. This criterion may be arbitrarily chosen, for example the selection code may apply a hash on the input data and choose block A if the hash is odd or block B if the hash is even. Blocks A and B may contain some code that does not alter the program result, but obfuscates the operation of the program. For example, blocks A and B could contain code to manipulate some dummy variable 312. Moreover, these additional blocks contain transition code to transfer the execution point of the program to the same block as block 1 of the original program 100 would: to block 2. This way, an arbitrary number of additional blocks may be added to the original program, complicating the structure of the program without altering the result.

Figure 4:
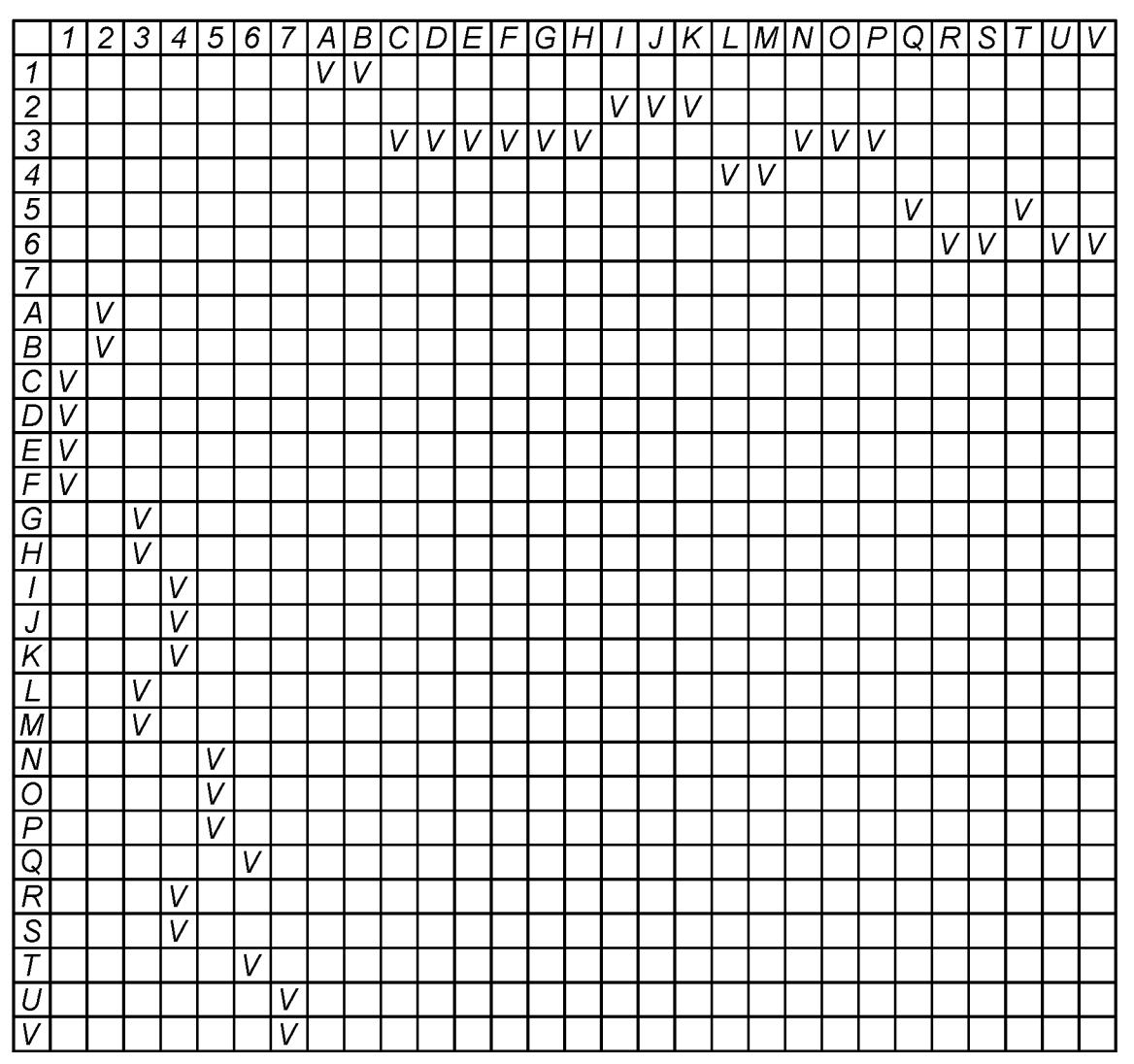

FIG. 4 shows a representation of the edges in the first example updated computer program. As can be appreciated by FIG. 3 and FIG. 4, the number of edges in the first example updated computer program 300 is 44 edges, which is significantly more than the 9 edges of the original program 100.

Figure 5:
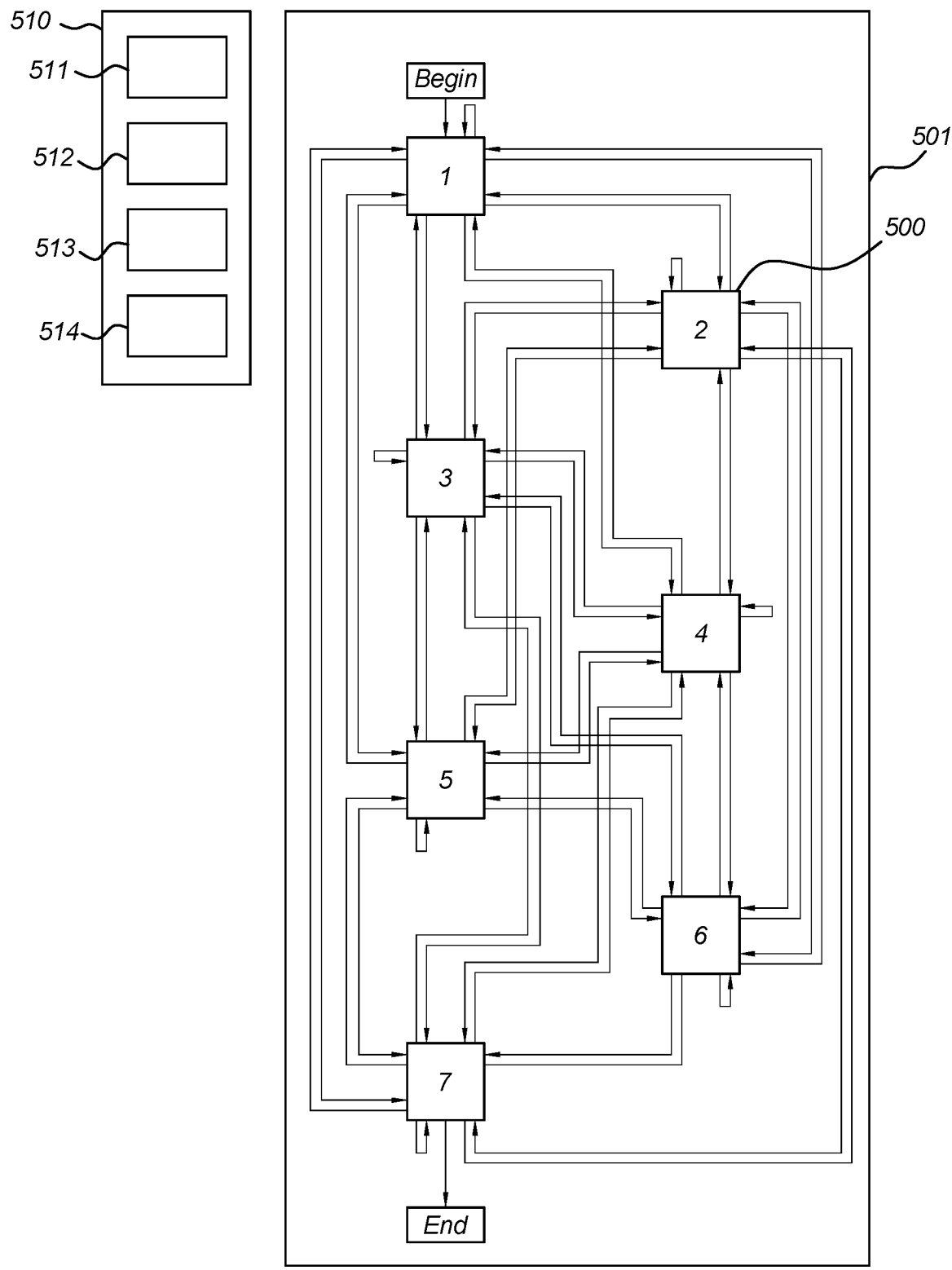
FIG. 5 shows a diagram of a second example updated computer program.

FIG. 5 shows a diagram of a second example updated computer program 500 that is based on the example original program 100. The figure also shows a runtime memory 510 showing some of the variables used during execution of the second example updated computer program 500. The runtime memory 510 may comprise variables 511, dummy variables 512, a mode variable 513, and a next block variable 514. In the second example updated computer program 500, the existing blocks 1 to 7 have been modified to form updated code blocks 501, so that these blocks support a normal mode and a neutral mode. The current mode is memorized by a mode variable 513. In the normal mode, the code block performs the same function as the corresponding code block of the original program 100. In the neutral mode, no operation is performed that can influence the result or output of the program. That can be guaranteed by ensuring, for example, that in the neutral mode the variables 511 of the program are not referenced. For example, in neutral mode, some dummy variable 512 is referenced for reading and/or writing. By using pointer arithmetic, a program variable 511 or a dummy variable 512 may be referenced by performing a calculation involving the mode variable 513. This way the selection of a program variable 511 or dummy variable 512 does not need to involve an if statement. The updated blocks 501 are programmed to set the mode variable 513 to neutral mode under certain conditions. These conditions may vary in different implementations. In the neutral mode, the selection code provided in the updated blocks 501 selects one of a plurality of blocks in dependence on the input data, and performs a transition of the execution point to the selected block in neutral mode. The selected block is performed in neutral mode without altering the program variables 511, and optionally writing a value to some dummy variable 512. The instructions in the code block further decide whether the next block is to be performed in the neutral mode or in the normal mode and set the mode variable 513 accordingly. Moreover, if the next block is to be performed in the neutral mode, selection code is applied to select the next block to be performed in neutral mode. On the other hand, if the next block is to be performed in the normal mode, it is determined what should be the next block to be executed in the normal mode, according to the execution path of the original program 100. In some implementations, that next block is stored in a runtime variable 514 by the previous block that was executed in the normal mode.

FIG. 6 shows a representation of the edges in the second example updated computer program 500. As shown, in the present example, any block can jump to any next block. This makes the number of edges equal to the square of the number of blocks. In the present example, this amounts to 49 edges.

FIG. 7 shows a diagram of a third example updated computer program 700 including a dispatcher 701. The updated code blocks 702 are numbered 1 to 7 in the example drawing, corresponding to blocks 1 to 7 of the original computer program 100. Edges are only present between the dispatcher 701 and the blocks 702. In the example with 7 original code blocks, this amounts to 14 edges. For larger programs, the number of edges 703 may be smaller in a flattened computer program compared to a program before flattening. Moreover, the execution paths of the program may be more difficult to understand, making it more difficult to analyze the program.

FIG. 8 shows a diagram of a first example of a dispatcher 801, which may be used in the configuration illustrated in FIG. 7. The dispatcher 801 comprises a number of dispatcher code blocks 802, which may optionally execute some code in a neutral mode, writing a value to a dummy variable for example. Moreover, each dispatcher code block 802 (labeled A to G in FIG. 8) may be programmed to perform a transition of the execution point to the next code block 702 (e.g. one of 1 to 7 in FIG. 7) in an identical way. Moreover, each code block 702 may comprise selection code to select one of the dispatcher code blocks 802, and transition code to perform the transition of the execution point to the selected dispatcher code block. For example, the program code block 702 may store the next block that has to be executed in the normal mode in a temporary variable, so that the dispatcher code block can reference the temporary variable and perform the transition to the stored next code block. Other ways to ensure the correct program flow are within the reach of the person skilled in the art.

Figures 9, 10:
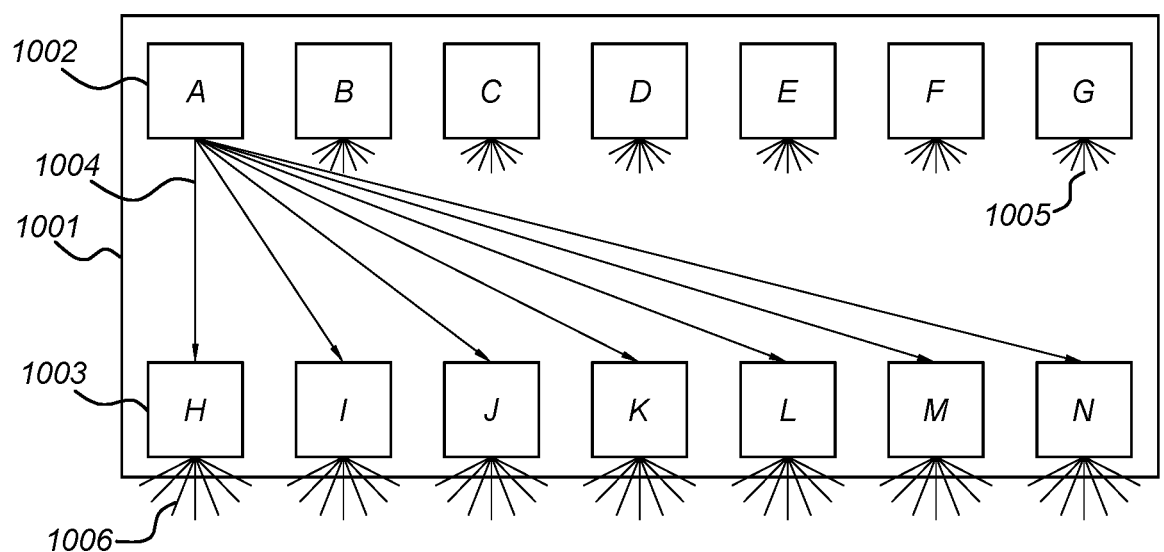
FIG. 9 shows a representation of the edges based on the first example of the dispatcher.
FIG. 10 shows a diagram of a second example of a dispatcher.

FIG. 9 shows a representation of the edges based on the first example of the dispatcher 801. The code blocks 1 to 7 that perform the substantive function of the program have edges to all of the dispatcher code blocks A to G, and the dispatcher code blocks A to G have edges to the code blocks 1 to 7. This results in this simplified example to 98 edges: two times the product of the number of substantive code blocks and dispatcher code blocks.

FIG. 10 shows a diagram of a second example of a dispatcher 1001. The second dispatcher 1001 can be used as the dispatcher 701 in the example updated computer program 700. The dispatcher 1001 has a plurality of first dispatcher code blocks 1002 and a plurality of second dispatcher code blocks 1003. The edges 1004 originating from node A have been drawn in full. Edges originating from the other code blocks have only been drawn partially in FIG. 10, in order not to obscure the figure. The dispatcher code blocks 1002 and 1003 may be executed in a neutral mode. The first dispatcher code blocks 1002 comprise selection code to select one of the second dispatcher code blocks 1003, in dependence on the input data, and transition code to transition the execution point to the selected one of the second dispatcher code blocks 1003. The second dispatcher code blocks 1003 contain transition code that transfers the execution point to the next code block 702 to be executed. An identification of the next code block 702 to be executed may be stored in a variable, for example, by the previous code block 702 before invoking the dispatcher.

FIG. 11 shows a representation of the edges of a computer program based on the second example of the dispatcher, wherein the second dispatcher 1001 takes the place of the dispatcher 701 in computer program 700. Edges exist from program code blocks 1 through 7 to first dispatcher code blocks A through G; from first dispatcher code blocks A through G to second dispatcher code blocks H through N, and from second dispatcher code blocks H through N to program code blocks 1 through 7. This provides a total number of edges that can be calculated as the product of the number of program code blocks and the number of first dispatcher code blocks, plus the product of the number of first dispatcher code blocks and the number of second dispatcher code blocks, plus the product of the number of second dispatcher code blocks and the number of program code blocks. In the present example, this amounts to 7*7+7*7+7*7=343 edges.

In all embodiments disclosed above, it is possible to concentrate the number of blocks and edges that are used for obfuscation in the beginning of the program flow. For example, more of these obfuscation edges may be inserted in the beginning of the execution path of the computer code. This way, an analyzer of the program tends to spend much time analyzing the spurious edges without even arriving at the edges that correspond to real program functionality.

It is possible to combine the approach disclosed in relation to FIG. 5 and FIG. 6 with the approach disclosed in relation to FIG. 7 to FIG. 11. FIG. 5 shows computer program 500 with code blocks that can operate in a normal mode and in a neutral mode. In the normal mode, the functionality of corresponding blocks of the original computer program 100 is performed. In the neutral mode, some alternative instructions are executed to obfuscate the program. It is possible to program the code blocks so that in neutral mode they perform the function of the dispatcher 701. Code blocks of the original computer program may be updated in such a way that, in neutral mode, they perform the functionality of one of the code blocks 802, 1002, or 1003, of the dispatcher 701, 801, or 1001. This may result in edges between many pairs of code blocks, as illustrated in FIG. 6, without necessarily increasing the number of code blocks, but making the execution path much more complex.

Figure 12:
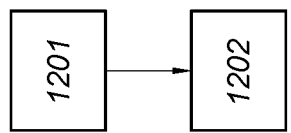
FIG. 12 shows a flow chart of a method of obfuscating a computer code.

FIG. 12 shows a flow chart of a method of obfuscating a computer code. The method starts at step 1201, of receiving an original computer program with computer instructions. The computer program may have the form of source code, assembly code, binary code, or any form of machine readable instructions. The original computer program comprises a plurality of code blocks with computer instructions. Blocks can be recognized as subroutines, for example. However, smaller blocks can also be identified in computer code. Any jump instruction in machine code may be recognized as the end of a code block, and the target address of a jump instruction may be recognized as the beginning of a code block. Even a sequence of to-be-consecutively-executed instructions may be divided into blocks of consecutive instructions. Thus, a for-loop may be considered a code block. It will be understood that the division into code blocks can be made in several different ways. The method may comprise a parsing step to parse the original computer program to divide the original computer program into a plurality of code blocks. Alternatively, the division into code blocks may be given as an additional input to the method.

The original computer program is operable on input data. Typically a computer program accepts any input data within a certain input space. For example, the computer program may be configured to receive an input file, or may be provided with one or more numeric values or a text string as input data. The type of input data accepted by the computer program is usually defined by the computer program itself.

Moreover, the original computer program is operable to follow an execution path through the plurality of code blocks when processing the input data. This execution path typically depends on the input data, for example due to an if-statement that performs a jump that is conditional on a certain value of the input data. This way, the input space is segmented into at least one segment according to a segmentation, each segment comprising a subset of the input space containing inputs that correspond to a same execution path. However, the execution path need not be fully determined by the input data. For example, external parameters, such as time or GPS position, or a pseudo-random generator, may influence the execution path. However, given a certain set of external parameters and random values, the execution path may be determined by the input data and the input data is thus segmented by the corresponding execution path.

After receiving the original computer program in step 1201, and optionally parsing the original computer program to divide the original computer program into a plurality of code blocks, the method proceeds to step 1202, and an updated computer program is generated based on the original computer program. The original computer program and the updated computer program are operable to generate at least an identical result. This result typically depends on the input data. In addition to the identical result, the programs may also generate a specific result. For example, a version indicator may be output to indicate whether the result is generated by the original computer program or the updated computer program. The updated computer program may also have the form of source code, assembly code, or binary code or any other form of machine readable computer instructions. The format (e.g. computer language, source code format, machine code format, or other format) of the updated computer program may be the same as the format of the original computer program. For example, if the original program is received in source code format, the updated program may also be in source code. However, these formats need not be the same. For example, if the method is performed by e.g. a compiler, the method could be incorporated in a compiling method and the updated program could be in executable format, e.g. binary format. In such a case the execution path of the original program would refer to the execution path that would result when the source code of the original program would be compiled without the disclosed obfuscation method.

Figure 13:
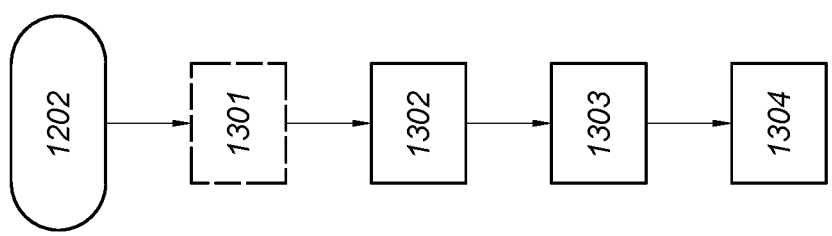
FIG. 13 shows a flow chart of a method of generating an updated computer program based on an original computer program.

FIG. 13 shows a flow chart of a method of generating an updated computer program based on an original computer program, i.e. an example implementation of step 1202 of FIG. 12. Optional step 1301 is described elsewhere in this disclosure. The method may start at step 1302 by including a plurality of updated code blocks in the updated computer program. These updated code blocks may contain, among others, any one or more of the following: copies of original code blocks, modified versions of original code blocks, and new code blocks. Examples of such code blocks have been disclosed hereinabove in relation to the example computer programs.

In step 1303, selection code is generated. This selection code may comprise one or more computer instructions. The selection code is operable, during execution of the updated computer program, to select an updated code block of the plurality of updated code blocks in dependence on the input data. Several examples of possible selections have been disclosed hereinabove.

In step 1304, the selection code is included in the updated computer program along with transition code involving a transition of an execution point to the updated block selected by the selection code. For example, this transition code may contain a jump to the address of the code block selected by the selection code.

Together, the selection code and the transition code cause the computer program to follow a different execution path through the computer program. That is, the sequence of blocks executed by the updated computer program is different from the sequence of blocks executed by the original computer program. In particular, the way in which the execution path depends on the input data differs between these programs. The updated computer program segments the input space according to an updated segmentation that is different from the segmentation of the original computer program.

In a highly simplified example, consider an original computer program that has input data comprising an input value i and two execution paths: a first execution path for an input value i smaller than 5, and a second execution path for the input value i at least 5. Thus the input data is segmented in two segments, the first segment i<5 and the second segment i>=5. The updated computer program may have, for example, four execution paths: a first execution path for an input value i smaller than 3, a second execution path for the input value i at least 3 but smaller than 5, a third execution path for the input value i at least 5 but smaller than 7, and a fourth execution path for the input value i at least 7. Thus, the input data is segmented in four segments, the first segment i<3, the second segment 3<=i<5, the third segment 5<=i<7, and the fourth segment i>=7. Thus, the input space is segmented by the original computer program differently than by the updated computer program.

Figure 14:
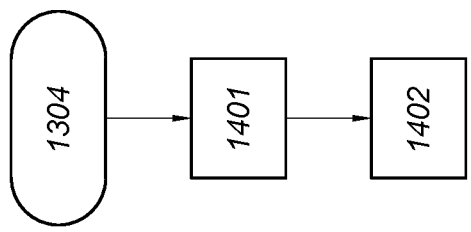
FIG. 14 shows a flow chart of a method of including selection code in an updated computer program along with transition code for transferring an execution point to the updated block selected by the selection code.

FIG. 14 shows a flow chart of a method of including selection code in an updated computer program along with transition code for transferring an execution point to the updated block selected by the selection code, i.e. an example implementation of step 1304 of FIG. 13. First, in step 1401, original transition code is identified that involves a transition of the execution point from a first original code block of the original program and a second original code block of the original program. Such transition code may be detected as part of an 'if' statement, a jump, a call. Such transition code may be explicitly written in a source code of the program, or be included by an optimizing compiler, for example. The identification step 1401 may thus be operable to parse the source code of the original program or the machine code of the original program (assembly or binary code), whichever is available. The machine code may reveal a more detailed block structure than the source code, but either code may be used.

Next, in step 1402, the original transition code may be replaced by the transition code involving the transition of the execution point to the updated code block selected by the selection code. Preferably, this replacement transition code comprises code to store an identification of the second original code block. That second original code block is in fact the next block that needs to be executed, in order to guarantee the identical result. However, in the updated computer program, before executing that next block, at least the block selected by the selection code is executed, since the replacement transition code causes the execution of the updated code block selected by the selection code. By storing the identification of the second original code block, the updated code block can read the stored identification and resume operation at the second original code block. For example, the next code block may be stored in a global variable so that any updated code block can access it. It will be understood that the identification of the second original code block generally means an identification of any code block in the updated computer program that performs the function of the second original code block. That code block in the updated computer program may have additional code, including additional selection code or replacement transition code, to obfuscate the program.

In some implementations, the updated code block selected by the selection code may be fully determined by the input data. In this case, the segmentation appears to be highly relevant for an analyzer. Alternatively, the updated code block selected by the selection code may be partially determined by the input data and may further depend on, for example, a random value or another external variable (current time, location information received from a location sensor, etc.).

With reference to FIG. 12 and FIG. 13, the step 1202 of generating an updated computer program may comprise step 1301 of flattening the computer program by including in the updated computer program a dispatcher 701. The dispatcher may comprise one or more updated code blocks. Moreover, the flattening comprises replacing a plurality of transition code, involving a transition from a first code block to a second code block, by an updated transition code involving a transition from the first code block to the dispatcher and a transition from the dispatcher to the second code block. One possibility to implement this is by configuring the transition code involving the transition from the first code block to the dispatcher to store an indication of the second code block. The transition code involving the transition from the dispatcher to the second code block may retrieve the indication of the second code block so that execution is resumed at the second code block.

The dispatcher 701 may comprise a plurality of code blocks, which may involve one or more transitions from dispatcher code block to dispatcher code block, in dependence on the input data, to create a complex execution path within the dispatcher. These dispatcher code blocks may operate in neutral mode and optionally do calculations and/or write data to some dummy variables, to obfuscate the updated computer program.

For example, wherein the dispatcher 801, 1001 comprises a plurality of first dispatcher code blocks 802, 1002. These dispatcher code blocks are part of the updated code blocks that are included in the updated computer program. These dispatcher code blocks may operate in neutral mode as discussed above. The first code block, that contains the transition to the first dispatcher code block, comprises selection code that is operable, during execution of the updated computer program, to select a first dispatcher code block among the plurality of first dispatcher code blocks in dependence on the input data according to the updated segmentation. The first code block further comprises transition code that implements the transition from the first code block to the first dispatcher code block thus selected.

The first dispatcher code block may comprise transition code to implement the transition from the first dispatcher to the second code block. This may be implemented, for example, by referencing the stored indication of the second code block. However, other implementation manners to resume execution at the second code block are equally possible. Moreover, it is possible that the first dispatcher code block, or in general any dispatcher code block, selects and transfers execution to a next dispatcher code block. The next dispatcher code block can either implement the transition to the second code block, or select and transfer execution to another next dispatcher code block, and so on.

For example, with reference to FIG. 10, the dispatcher 1001 can comprise a plurality of first dispatcher code blocks 1002 as described above, and a plurality of second dispatcher code blocks 1003. The first dispatcher code blocks 1002 may comprise selection code that is configured to, during execution of the updated computer program, select a particular second dispatcher code block among the plurality of second dispatcher code blocks 1003 in dependence on the input data according to the updated segmentation. Moreover, the first dispatcher code blocks may comprise transition code involving a transition from the respective first dispatcher code block to the selected second dispatcher block. The second dispatcher code blocks may comprise transition code involving a transition from the respective second dispatcher code block to the second code block. Alternatively, the second dispatcher code blocks may comprise transition code involving a transition from the second dispatcher code block to a selected one of a plurality of third dispatcher code blocks, and so on, until a dispatcher code block resumes operation at the second code block.

Referring to FIG. 13, step 1302 of including a plurality of updated code blocks in the updated computer program 1302 may comprise generating a first updated code block from a first code block of the original program. For example, this may be done by replacing code of the first code block (101) that references a first variable, by code that references either one of the first variable or a second variable in dependence on a value of a mode variable. The mode variable can indicate at least two modes: a normal mode and a neutral mode. The normal mode indicates the operation on variables is to be performed as in the original computer program, whereas the neutral mode indicates that obfuscation operations are to be performed, and no undesirable side effect should be generated by the obfuscation operations. This may be implemented by code that operates so that in case the value of the mode variable indicates a normal mode, in the first updated code block 501, an operation is performed on the value of the first variable, which is identical to the operation on the first variable performed by the first code block 101 of the original program. Moreover, in case the value of the mode variable indicates a neutral mode, the instructions of the updated code block 501 do not affect the first variable. In case the value of the mode variable indicates a neutral mode, the instructions of the updated code block 501 may change the referenced second variable. Alternatively, the updated code block 501 may read a value of the second variable. Changing the second variable helps to obfuscate the program, because a fuzzer may concentrate analysis on code blocks that write values to variables.

The transition code involving a transition of an execution point to the first updated code block 501 selected by the selection code may be configured to perform the transition with the mode variable having the value indicating the neutral mode. Thus, the first updated code block 501 selected by the selection code may be executed in the neutral mode. Thus, since the selection code selects one of a plurality of updated code blocks, it does not matter which one is selected by the selection code since the selected code block will be executed in neutral mode anyway, so that it does not produce side effects.

The first updated code block 501 may comprise transition code that, when the value of the mode variable indicates neutral mode, sets the mode variable to a value that indicates the normal mode and performs a transition of the execution point to an address based on a stored indication of a code block. This stored indication has been stored by the previous code block that was executed in the normal mode, for example.

The dispatcher code blocks and the code blocks performing the functionality of the original computer program may partially or completely be the same blocks. For example, a code block can perform the function of a dispatcher code block in neutral mode, and perform the function of a normal code block in normal mode. Such a code block, which supports the normal mode and the neutral mode, can be modified further by including therein the code to build one of the dispatcher code blocks 802, 1002, 1003. This dispatcher code may be executed in dependence on the mode variable, so that the dispatcher code is performed in the neutral mode. Thus, the updated transition code involving the transition from the above-mentioned first code block to the dispatcher 801, 1001 may be configured to cause execution of the selected dispatcher code block 802, 1002, 1003 with the mode variable having the value indicating the neutral mode. In the neutral mode, the dispatcher code block performs a transition as stipulated by the structure of the dispatcher code blocks, examples of which are disclosed herein, and may optionally write data to a dummy variable. The updated transition code involving the transition from a dispatcher code block to the second (non-dispatcher) code block is configured to cause execution of the second code block with the mode variable having the value indicating the normal mode. In the normal mode, the same code block does not perform dispatcher functions but rather performs a function of a corresponding code block of the original computer program. Moreover, in normal mode the same code block may store the next block to be executed in normal mode and perform a transition to the dispatcher, setting the mode variable to neutral mode.

Referring to FIG. 10, a multi-layer dispatcher may be inserted into the updated computer program by the method. Such a multi-layer dispatcher comprises first dispatcher code blocks and second dispatcher code blocks, as disclosed above. The first updated code block 501 and a first dispatcher code block 1002 may be combined into a single code block, wherein the resulting updated code block is configured to execute the transition code comprising a transition from the first dispatcher code block 1002 to the second dispatcher code block 1003 if the mode variable has the value indicating the neutral mode. However, that resulting updated code block is configured to execute the transition code corresponding to the execution path of the original computer program 703 if the mode variable has the value indicating the normal mode. It will be understood that this transition code corresponding to the execution path of the original computer program may involve a transition to the dispatcher, followed by a transition from the dispatcher to the next code block in accordance with the execution path of the original computer program.

Figure 15:
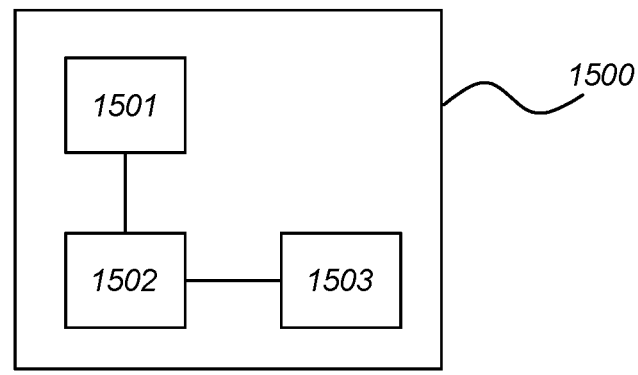
FIG. 15 shows a block diagram of a system for obfuscating a computer code.

FIG. 15 shows a block diagram of a system 1500 for obfuscating a computer code. The system may be implemented as a computer system, for example a workstation or a computer server, or a distributed server system. The system 1500 comprises a memory 1501, which may be implemented as any storage device, such as RAM, flash memory, magnetic disk, or other type of memory. The system further may comprise a communication device 1503, such as a wired or wireless network adapter or an interface, such as USB, to a user input device or an external storage media, or the user input device itself. The communication device may comprise a touch screen, display, and/or pointer device such as a mouse. The communication device 1503 may optionally be used to control operation of the system 1500, such as triggering execution of the method, or to provide an original computer program to the system, or to export a generated updated computer program.

The system 1500 further comprises a control unit 1502, such as a computer processor or a plurality of processors. The control unit 1502 controls operation of the system 1500 including the memory 1501 and the optional communication device 1503.

In particular, the control unit 1502 may control to receive an original computer program via the communication device 1503 and store the original computer program in the memory 1501. Likewise, the memory 1501 is configured to store an original computer program comprising a plurality of code blocks with computer instructions, the original computer program operable on input data within an input space, the original computer program operable to follow an execution path through the plurality of code blocks when receiving the input data, wherein the input space is segmented into at least one segment according to a segmentation, each segment comprising a subset of the input space containing inputs that correspond to a same execution path.

The control unit 1502 is further configured to control to perform any variant of the methods for obfuscating a computer program, as described above. For example, the control unit controls to generate an updated computer program based on the original computer program. The control unit may be configured to store the updated computer program in the memory 1501 and/or exporting the updated computer program via communication device 1503. The control unit 1502 may be configured to generate the updated computer program by including a plurality of updated code blocks in the updated computer program, generating selection code operable, during execution of the updated computer program, to select an updated code block of the plurality of updated code blocks in dependence on the input data, and including the selection code in the updated computer program along with transition code involving a transition of an execution point to the updated block selected by the selection code, wherein the selection code is configured to cause the updated computer program to segment the input space according to an updated segmentation, the updated segmentation being different from the segmentation of the original computer program, and wherein the original computer program and the updated computer program are operable to generate at least an identical result, which identical result depends on the input data.

Although the present disclosure has been described by means of illustrated example, various changes and modifications may be suggested to one skilled in the art. It is intended that the present disclosure encompass such changes and modifications as fall within the scope of the appended claims.

It will be appreciated that the invention applies to computer programs, particularly computer programs on or in a carrier, adapted to put the invention into practice. The program may be in the form of a source code, an object code, a code intermediate source and object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM or RAM memory, or a data storage disc or flash drive. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or to be used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method comprising:
  receiving an original computer program,
    wherein the original computer program comprises a plurality of code blocks,
    wherein the code blocks comprise computer instructions, wherein the original computer program is arranged to operate on input data within an input space,
wherein the original computer program is arranged to operate to follow an execution path through the plurality of code blocks when receiving the input data,
wherein the input space is segmented into at least one segment according to a segmentation,
wherein each segment comprises a subset of the input space,
wherein each subset of the input space contains inputs that correspond to a same execution path;
generating an updated computer program based on the original computer program, wherein generating the updated computer program comprises:
including a plurality of updated code blocks in the updated computer program;
generating selection code, wherein the selection codes is arranged to select an updated code block of the plurality of updated code blocks in dependence on the input data,
wherein updated computer program comprises the selection code and transition code,
wherein the transition code comprises a transition of an execution point to the updated block selected by the selection code,
wherein the selection code is configured to cause the updated computer program to segment the input space according to an updated segmentation,
wherein the updated segmentation is different from the segmentation of the original computer program,
wherein the original computer program and the updated computer program are arranged to generate at least an identical result,
wherein the identical result depends on the input data; and
flattening the computer program by including in the updated computer program a dispatcher and replacing a transition code, by an updated transition code,
wherein the transition code comprises a transition from a first code block to a second code block,
wherein the updated transition code comprises a transition from the first code block to the dispatcher and a transition from the dispatcher to the second code block.

2. The method of claim 1,
wherein the dispatcher comprises a plurality of first dispatcher code blocks,
wherein the first code block comprises the selection code,
wherein the selection code is arranged to select a first dispatcher code block among the plurality of first dispatcher code blocks in dependence on the input data according to the updated segmentation and the updated transition code.

3. The method of claim 2,
wherein the dispatcher comprises a plurality of second dispatcher code blocks,
wherein the first dispatcher code block comprises the selection code,
wherein the selection code is arranged to select a second dispatcher code block among the plurality of second dispatcher code blocks in dependence on the input data according to the updated segmentation and the updated transition code.

4. The method of claim 3,
wherein the first code block reference a first variable,
wherein including a plurality of updated code blocks in the updated computer program comprises generating a first updated code block from a first code block of the original computer program by:
replacing code of the first code block by code that references either one of the first variable or a second variable in dependence on a value of a mode variable,
wherein on exit of the first updated code block the value of the first variable is identical to the value of the first variable on exit of the first code block of the original computer program when the value of the mode variable indicates a normal mode,
wherein the instructions of the updated code block do not affect the first variable when the value of the mode variable indicates a neutral mode,
wherein the first updated code block comprises at least one of the first dispatcher code blocks,
wherein the at least one of the first dispatcher code blocks is configured to execute the transition code,
wherein the transition code comprises a transition from the first dispatcher code block to the second dispatcher code block when the mode variable indicates the neutral mode,
wherein the transition code corresponding to the execution path of the original computer program if the mode variable indicates the normal mode.

5. The method of claim 2,
wherein the first dispatcher block or the second dispatcher code block comprises transition code,
wherein the transition code comprises a transition from one of the first dispatcher code or the second dispatcher code block to the second code block.

6. The method of claim 2,
wherein the first code block reference a first variable,
wherein including a plurality of updated code blocks in the updated computer program comprises generating a first updated code block from a first code block of the original computer program by:
replacing code of the first code block by code that references either one of the first variable or a second variable in dependence on a value of a mode variable,
wherein on exit of the first updated code block the value of the first variable is identical to the value of the first variable on exit of the first code block of the original computer program when the value of the mode variable indicates a normal mode,
wherein the instructions of the updated code block do not affect the first variable when the value of the mode variable indicates a neutral mode,
wherein the first updated code block comprises at least one of the dispatcher code blocks,
wherein the updated transition code is configured to cause execution of the at least one dispatcher code block when the value of the mode variable indicates the neutral mode,
wherein the updated transition code comprises a transition from the first code block to the dispatcher.

7. The method of claim 2,
wherein the first code block reference a first variable,
wherein including a plurality of updated code blocks in the updated computer program comprises generating a first updated code block from a first code block of the original computer program by:

replacing code of the first code block by code that references either one of the first variable or a second variable in dependence on a value of a mode variable, wherein on exit of the first updated code block the value of the first variable is identical to the value of the first variable on exit of the first code block of the original computer program when the value of the mode variable indicates a normal mode, wherein the instructions of the updated code block do not affect the first variable when the value of the mode variable indicates a neutral mode, wherein the updated transition code comprises the transition from the dispatcher to the second code block, wherein the transition code is configured to cause execution of the second code block when the mode variable indicates the normal mode.

8. The method of claim 1, wherein the including the selection code in the updated computer program along with transition code for transferring an execution point to the updated block selected by the selection code comprises:

identifying original transition code,
wherein the original transition code comprises a transition of the execution point from a first original code block and a second original code block,
wherein the original computer program comprises the first original block and the second original code block; and replacing the original transition code by the transition code,
wherein the transition code comprises storing code,
wherein the storing code is arranged to store an identification of the second original code block,
wherein one of the updated code blocks is arranged to perform a transition to the second original code block using the stored identification.

9. A method comprising:
receiving an original computer program,
wherein the original computer program comprises a plurality of code blocks,
wherein the code blocks comprise computer instructions,
wherein the original computer program is arranged to operate on input data within an input space,
wherein the original computer program is arranged to operate to follow an execution path through the plurality of code blocks when receiving the input data,
wherein the input space is segmented into at least one segment according to a segmentation,
wherein each segment comprises a subset of the input space,
wherein each subset of the input space contains inputs that correspond to a same execution path;
generating an updated computer program based on the original computer program, wherein generating the updated computer program comprises:
including a plurality of updated code blocks in the updated computer program;
generating selection code, wherein the selection codes is arranged to select an updated code block of the plurality of updated code blocks in dependence on the input data,
wherein updated computer program comprises the selection code and transition code, wherein the transition code comprises a transition of an execution point to the updated block selected by the selection code, wherein the selection code is configured to cause the updated computer program to segment the input space according to an updated segmentation, wherein the updated segmentation is different from the segmentation of the original computer program, wherein the original computer program and the updated computer program are arranged to generate at least an identical result, wherein the identical result depends on the input data, wherein the first code block reference a first variable, wherein including a plurality of updated code blocks in the updated computer program comprises generating a first updated code block from a first code block of the original computer program by:

replacing code of the first code block by code that references either one of the first variable or a second variable in dependence on a value of a mode variable, wherein on exit of the first updated code block the value of the first variable is identical to the value of the first variable on exit of the first code block of the original computer program when the value of the mode variable indicates a normal mode, and wherein the instructions of the updated code block do not affect the first variable when the value of the mode variable indicates a neutral mode.

10. The method of claim 9, wherein the instructions of the updated code block change the second variable when the value of the mode variable indicates a neutral mode.

11. The method of claim 9,
wherein the transition code comprises a transition of an execution point to the first updated code block,
wherein the first updated code block is selected by the selection code,
wherein the first updated code block is configured to perform the transition when the mode variable indicates the neutral mode.

12. The method of claim 9,
wherein the first updated code block comprises transition code that, sets the mode variable to a value that indicates the normal mode when the mode variable indicates neutral mode,
wherein transition code performs a transition of the execution point to an address based on a stored indication of a code block.

13. A computer program stored on a non-transitory medium, wherein the computer program when executed on a processor performs the method:

receiving an original computer program,
wherein the original computer program comprises a plurality of code blocks,
wherein the code blocks comprise computer instructions,
wherein the original computer program is arranged to operate on input data within an input space,
wherein the original computer program is arranged to operate to follow an execution path through the plurality of code blocks when receiving the input data,
wherein the input space is segmented into at least one segment according to a segmentation,
wherein each segment comprises a subset of the input space, wherein each subset of the input space contains inputs that correspond to a same execution path;
generating an updated computer program based on the original computer program, wherein generating the updated computer program comprises:
including a plurality of updated code blocks in the updated computer program;
generating selection code, wherein the selection codes is arranged to select an updated code block of the plurality of updated code blocks in dependence on the input data,
wherein updated computer program comprises the selection code and transition code,
wherein the transition code comprises a transition of an execution point to the updated block selected by the selection code,
wherein the selection code is configured to cause the updated computer program to segment the input space according to an updated segmentation,
wherein the updated segmentation is different from the segmentation of the original computer program,
wherein the original computer program and the updated computer program are arranged to generate at least an identical result,
wherein the identical result depends on the input data; and
flattening the computer program by including in the updated computer program a dispatcher and replacing a transition code, by an updated transition code,
wherein the transition code comprises a transition from a first code block to a second code block,
wherein the updated transition code comprises a transition from the first code block to the dispatcher and a transition from the dispatcher to the second code block.

14. A system for obfuscating a computer code, the system comprising
a memory circuit,
wherein the memory circuit is configured to store an original computer program,
wherein the original computer program comprises a plurality of code blocks,
wherein the code blocks comprise computer instructions,
wherein the original computer program operable on input data within an input space, the original computer program is arranged to operate to follow an execution path through the plurality of code blocks when receiving the input data,
wherein the input space is segmented into at least one segment according to a segmentation,
wherein each segment comprising a subset of the input space,
wherein each subset of the input space contains inputs that correspond to a same execution path; and
a control circuit,
wherein the control circuit is configured to generate an updated computer program based on the original computer program, wherein generating the updated computer program comprises:
including a plurality of updated code blocks in the updated computer program;
generating selection code operable, wherein the selection codes is arranged to select an updated code block of the plurality of updated code blocks in dependence on the input data; and
including the selection code and transition code in the updated computer program along, wherein the transition code comprises a transition of an execution point to the updated block selected by the selection code,
wherein the selection code is configured to cause the updated computer program to segment the input space according to an updated segmentation,
wherein the updated segmentation is different from the segmentation of the original computer program,
wherein the original computer program and the updated computer program are arranged to generate at least an identical result,
wherein the identical result depends on the input data,
wherein the control circuit is configured to flatten the computer program by including in the updated computer program a dispatcher and replacing a transition code, by an updated transition code,
wherein the transition code comprises a transition from a first code block to a second code block,
wherein the updated transition code comprises a transition from the first code block to the dispatcher and a transition from the dispatcher to the second code block.

15. The system of claim 14,
wherein the dispatcher comprises a plurality of first dispatcher code blocks,
wherein the first code block comprises the selection code,
wherein the selection code is arranged to select a first dispatcher code block among the plurality of first dispatcher code blocks in dependence on the input data according to the updated segmentation and the updated transition code.

16. The system of claim 14,
wherein the dispatcher comprises a plurality of second dispatcher code blocks,
wherein the first dispatcher code block comprises the selection code,
wherein the selection code is arranged to select a second dispatcher code block among the plurality of second dispatcher code blocks in dependence on the input data according to the updated segmentation and the updated transition code.

17. The system of claim 14,
wherein the first dispatcher block or the second dispatcher code block comprises transition code,
wherein the transition code comprises a transition from one of the first dispatcher code or the second dispatcher code block to the second code block.

18. The system of claim 14,
wherein the first code block references a first variable,
wherein including a plurality of updated code blocks in the updated computer program comprises generating a first updated code block from a first code block of the original computer program by:
replacing code of the first code block by code that references either one of the first variable or a second variable in dependence on a value of a mode variable,
wherein on exit of the first updated code block the value of the first variable is identical to the value of the first variable on exit of the first code block of the original computer program when the value of the mode variable indicates a normal mode, and
wherein the instructions of the updated code block do not affect the first variable when the value of the mode variable indicates a neutral mode.

19. A computer program stored on a non-transitory medium, wherein the computer program when executed on a processor performs the method:

receiving an original computer program,
- wherein the original computer program comprises a plurality of code blocks,
- wherein the code blocks comprise computer instructions,
- wherein the original computer program is arranged to operate on input data within an input space,
- wherein the original computer program is arranged to operate to follow an execution path through the plurality of code blocks when receiving the input data,
- wherein the input space is segmented into at least one segment according to a segmentation,
- wherein each segment comprises a subset of the input space,
- wherein each subset of the input space contains inputs that correspond to a same execution path;

generating an updated computer program based on the original computer program, wherein generating the updated computer program comprises:
- including a plurality of updated code blocks in the updated computer program;
- generating selection code, wherein the selection codes is arranged to select an updated code block of the plurality of updated code blocks in dependence on the input data,
- wherein updated computer program comprises the selection code and transition code,
- wherein the transition code comprises a transition of an execution point to the updated block selected by the selection code,
- wherein the selection code is configured to cause the updated computer program to segment the input space according to an updated segmentation,
- wherein the updated segmentation is different from the segmentation of the original computer program,
- wherein the original computer program and the updated computer program are arranged to generate at least an identical result,
- wherein the identical result depends on the input data, wherein the first code block reference a first variable, wherein including a plurality of updated code blocks in the updated computer program comprises generating a first updated code block from a first code block of the original computer program by:
- replacing code of the first code block by code that references either one of the first variable or a second variable in dependence on a value of a mode variable,
- wherein on exit of the first updated code block the value of the first variable is identical to the value of the first variable on exit of the first code block of the original computer program when the value of the mode variable indicates a normal mode, and
- wherein the instructions of the updated code block do not affect the first variable when the value of the mode variable indicates a neutral mode.

* * * * *